(12) United States Patent
Xu et al.

(10) Patent No.: US 12,249,017 B2
(45) Date of Patent: Mar. 11, 2025

(54) REDUCED DISPLAY PROCESSING UNIT TRANSFER TIME TO COMPENSATE FOR DELAYED GRAPHICS PROCESSING UNIT RENDER TIME

(71) Applicant: QUALCOMM Incorporated, San Diego, CA (US)

(72) Inventors: Yongjun Xu, Beijing (CN); Nan Zhang, Beijing (CN); Wenkai Yao, Beijing (CN); Long Han, Shanghai (CN)

(73) Assignee: QUALCOMM Incorporated, San Diego, CA (US)

( * ) Notice: Subject to any disclaimer, the term of this patent is extended or adjusted under 35 U.S.C. 154(b) by 206 days.

(21) Appl. No.: 17/794,876

(22) PCT Filed: Feb. 21, 2020

(86) PCT No.: PCT/CN2020/076205
§ 371 (c)(1),
(2) Date: Jul. 22, 2022

(87) PCT Pub. No.: WO2021/164004
PCT Pub. Date: Aug. 26, 2021

(65) Prior Publication Data
US 2023/0073736 A1  Mar. 9, 2023

(51) Int. Cl.
*G06T 15/00* (2011.01)
*G06F 1/12* (2006.01)
*G06T 1/20* (2006.01)

(52) U.S. Cl.
CPC .............. *G06T 15/005* (2013.01); *G06F 1/12* (2013.01); *G06T 1/20* (2013.01)

(58) Field of Classification Search
CPC ............ G06T 15/005; G06T 1/20; G06F 1/12
See application file for complete search history.

(56) References Cited

U.S. PATENT DOCUMENTS 3,691,545 A * 9/1972 Clark .................... G01T 1/1647
360/48
4,349,832 A * 9/1982 Gallo ................... G11B 17/005
375/365

(Continued)

FOREIGN PATENT DOCUMENTS

CN       104620311 A      5/2015
CN       104917990 A      9/2015
(Continued)

OTHER PUBLICATIONS

International Search Report and Written Opinion—PCT/CN2020/076205—ISA/EPO—Nov. 24, 2020.

(Continued)

*Primary Examiner* — Charles L Beard
(74) *Attorney, Agent, or Firm* — Procopio, Cory, Hargreaves & Savitch

(57) ABSTRACT

Devices and methods for reducing a DPU transfer time to compensate for a delayed GPU render time. After completion of rendering a second frame that follows a first frame, a frame processor determines whether the first frame is currently transferring to a display panel or has already been transferred to the display panel. At least one clock is used with a first set of clock speeds when the first frame is determined to be currently transferring and used with a second set of clock speeds when the first frame is determined to have already been transferred, the second set of clock speeds being faster than the first set of clock speeds. After completion of the transfer of the first frame, the second frame is transferred based on the set of clock speeds.

16 Claims, 7 Drawing Sheets

(56) References Cited

U.S. PATENT DOCUMENTS

| | | | | |
|---|---|---|---|---|
| 4,417,275 | A * | 11/1983 | Harshbarger | H04N 17/045 348/521 |
| 4,518,995 | A * | 5/1985 | Harshbarger | H04N 17/045 348/521 |
| 4,751,699 | A * | 6/1988 | Tarridec | H04J 3/1647 370/538 |
| 4,805,024 | A * | 2/1989 | Suzuki | H04N 25/72 348/E3.019 |
| 4,860,283 | A * | 8/1989 | Takano | H04J 3/1629 370/510 |
| 5,502,511 | A * | 3/1996 | Nagel | H04N 3/223 348/184 |
| 5,555,024 | A * | 9/1996 | Limberg | H04N 7/08 348/E7.024 |
| 5,612,900 | A * | 3/1997 | Azadegan | H04N 19/60 386/E9.013 |
| 5,717,469 | A * | 2/1998 | Jennes | H04N 5/20 348/715 |
| 5,929,924 | A * | 7/1999 | Chen | H04N 7/01 348/E7.003 |
| 6,040,861 | A * | 3/2000 | Boroczky | H04N 19/14 370/278 |
| 6,097,757 | A * | 8/2000 | Boice | H04N 19/107 375/E7.185 |
| 6,674,469 | B1 * | 1/2004 | Watanabe | H01L 27/1485 348/E3.018 |
| 7,038,669 | B2 * | 5/2006 | Myers | G09G 5/006 345/206 |
| 7,091,967 | B2 * | 8/2006 | Gong | G09G 5/006 345/3.4 |
| 7,142,187 | B1 * | 11/2006 | Kim | G09G 5/18 345/87 |
| 7,154,552 | B1 * | 12/2006 | Watanabe | H04N 25/72 348/E3.018 |
| 7,318,002 | B2 * | 1/2008 | Kulidjian | G09G 3/006 348/E17.005 |
| 7,710,501 | B1 * | 5/2010 | Adams | H04N 7/0105 348/548 |
| 9,717,051 | B2 * | 7/2017 | Ambapuram | H04W 52/029 |
| 10,096,080 | B2 * | 10/2018 | Kwa | G06T 1/20 |
| 10,096,302 | B2 * | 10/2018 | Roh | G09G 5/18 |
| 2001/0038387 | A1 * | 11/2001 | Tomooka | G09G 5/006 345/635 |
| 2002/0004413 | A1 * | 1/2002 | Inoue | H04N 7/142 455/566 |
| 2002/0113904 | A1 * | 8/2002 | Champion | H04N 5/14 348/E7.003 |
| 2002/0146023 | A1 * | 10/2002 | Myers | H04L 47/2416 370/537 |
| 2003/0179221 | A1 * | 9/2003 | Nitta | G09G 3/3648 345/690 |
| 2004/0174439 | A1 * | 9/2004 | Upton | H04N 25/745 348/E3.018 |
| 2004/0207756 | A1 * | 10/2004 | Fujii | H04N 5/10 348/521 |
| 2006/0146185 | A1 * | 7/2006 | Chen | H04N 21/2368 348/410.1 |
| 2007/0091042 | A1 * | 4/2007 | Chung | G09G 3/3648 345/88 |
| 2007/0165015 | A1 * | 7/2007 | Li | G09G 3/20 345/204 |
| 2007/0169161 | A1 * | 7/2007 | Kienzle | H04N 21/234381 725/89 |
| 2007/0206018 | A1 | 9/2007 | Bajic et al. | |
| 2008/0129868 | A1 * | 6/2008 | Simpson | H04N 21/43072 348/E7.069 |
| 2008/0158212 | A1 * | 7/2008 | Maruyama | G09G 3/2025 345/208 |
| 2008/0225062 | A1 * | 9/2008 | Chang | G09G 3/3208 345/691 |
| 2008/0239089 | A1 * | 10/2008 | Ikeyama | H04N 21/4302 348/222.1 |
| 2008/0284785 | A1 * | 11/2008 | Axtman | G09G 5/393 345/545 |
| 2009/0185795 | A1 * | 7/2009 | Itani | H04N 21/47217 386/232 |
| 2009/0237391 | A1 * | 9/2009 | Yanagi | G09G 5/18 345/99 |
| 2010/0188574 | A1 * | 7/2010 | Hung | H04N 7/0132 348/718 |
| 2011/0032235 | A1 * | 2/2011 | Nose | G09G 3/3611 345/211 |
| 2011/0043546 | A1 * | 2/2011 | Matsumoto | G09G 3/3611 345/690 |
| 2011/0305443 | A1 * | 12/2011 | Sasaki | H04N 13/183 386/E5.028 |
| 2012/0086832 | A1 * | 4/2012 | Ruhman | A44C 15/0015 348/E5.026 |
| 2012/0215952 | A1 * | 8/2012 | Werner | H04N 21/242 710/33 |
| 2012/0256962 | A1 * | 10/2012 | Wen | H04N 13/139 345/660 |
| 2012/0272089 | A1 * | 10/2012 | Hatfield | H04J 3/00 713/600 |
| 2012/0287140 | A1 * | 11/2012 | Lin | G09G 3/2096 345/87 |
| 2013/0016726 | A1 * | 1/2013 | Numakura | G11C 8/16 370/394 |
| 2013/0063607 | A1 * | 3/2013 | Shimotono | H04N 17/002 348/207.11 |
| 2013/0093953 | A1 * | 4/2013 | Miyashita | H04N 25/531 348/521 |
| 2013/0271621 | A1 * | 10/2013 | Lee | H04N 23/63 348/222.1 |
| 2014/0002465 | A1 * | 1/2014 | Kwa | G06T 1/20 345/522 |
| 2014/0085275 | A1 | 3/2014 | Tripathi | |
| 2014/0160136 | A1 * | 6/2014 | Kaburlasos | G09G 5/00 345/520 |
| 2014/0223219 | A1 * | 8/2014 | Aelion | G06F 1/3206 713/400 |
| 2015/0181084 | A1 * | 6/2015 | Colenbrander | H04N 23/64 348/99 |
| 2015/0193959 | A1 * | 7/2015 | Shah | G06F 3/00 345/473 |
| 2015/0235343 | A1 * | 8/2015 | Asai | G09G 5/001 345/534 |
| 2015/0262547 | A1 * | 9/2015 | Higashino | G09G 5/006 345/58 |
| 2015/0264298 | A1 * | 9/2015 | Colenbrander | G09G 5/001 345/547 |
| 2015/0339994 | A1 * | 11/2015 | Verbeure | G09G 3/2003 345/214 |
| 2016/0210917 | A1 * | 7/2016 | Ishikawa | G09G 3/3614 |
| 2016/0225348 | A1 * | 8/2016 | Maiya | G06F 1/3206 |
| 2016/0335737 | A1 * | 11/2016 | Shah | G06F 9/5083 |
| 2017/0220062 | A1 * | 8/2017 | Shen | G06F 1/324 |
| 2017/0315652 | A1 * | 11/2017 | Pourbigharaz | G06F 3/0416 |
| 2017/0318068 | A1 * | 11/2017 | Kikkeri Shivadatta | H04J 3/0632 |
| 2018/0103231 | A1 * | 4/2018 | Ahn | G09G 5/005 |
| 2018/0174551 | A1 * | 6/2018 | Ansari | G09G 5/12 |
| 2018/0300838 | A1 * | 10/2018 | Park | G06F 3/14 |
| 2019/0043448 | A1 * | 2/2019 | Thakur | G09G 5/003 |
| 2019/0057484 | A1 * | 2/2019 | Iwamoto | G06F 9/4881 |
| 2019/0325844 | A1 * | 10/2019 | Ansari | G06F 1/3265 |
| 2020/0005723 | A1 * | 1/2020 | Kim | G09G 3/3696 |
| 2020/0128207 | A1 * | 4/2020 | Masuda | H04N 21/4436 |
| 2020/0135149 | A1 * | 4/2020 | Lin | G09G 5/18 |
| 2020/0175644 | A1 * | 6/2020 | Chen | G09G 5/393 |
| 2020/0302848 | A1 * | 9/2020 | Lin | G09G 3/36 |
| 2021/0093960 | A1 * | 4/2021 | Cerny | H04N 19/142 |
| 2021/0093962 | A1 * | 4/2021 | Colenbrander | H04N 21/2343 |
| 2021/0093963 | A1 * | 4/2021 | Colenbrander | H04N 21/2343 |
| 2021/0280156 | A1 * | 9/2021 | Mehta | G09G 5/10 |
| 2021/0392383 | A1 * | 12/2021 | Muthiah | H04N 5/77 |
| 2021/0400169 | A1 * | 12/2021 | Collin | G03H 1/2294 |
| 2021/0407456 | A1 * | 12/2021 | Hussain | G06T 1/20 |
| 2022/0093057 | A1 * | 3/2022 | Glen | G09G 5/006 |

(56) References Cited

U.S. PATENT DOCUMENTS

| | | | |
|---|---|---|---|
| 2022/0093062 A1* | 3/2022 | Glen | G09G 5/363 |
| 2022/0101794 A1* | 3/2022 | Kim | G09G 3/3266 |
| 2022/0108646 A1* | 4/2022 | Komanduru, V | G09G 3/20 |
| 2022/0122545 A1* | 4/2022 | Hong | G09G 3/3233 |
| 2022/0208145 A1* | 6/2022 | Glen | G06F 3/1446 |
| 2022/0254320 A1* | 8/2022 | Choi | G09G 5/12 |
| 2022/0358881 A1* | 11/2022 | Chae | G09G 3/3266 |
| 2022/0415282 A1* | 12/2022 | Li | G09G 5/006 |
| 2023/0024723 A1* | 1/2023 | Colenbrander | A63F 13/537 |
| 2023/0074876 A1* | 3/2023 | Xu | G06F 1/08 |
| 2023/0083289 A1* | 3/2023 | Lee | G09G 5/393 |
| | | | 345/204 |
| 2023/0142908 A1* | 5/2023 | Kim | G09G 3/32 |
| | | | 345/55 |
| 2023/0196498 A1* | 6/2023 | Ranka | G06F 3/14 |
| | | | 345/156 |
| 2023/0230534 A1* | 7/2023 | Koh | G09G 3/32 |
| | | | 345/55 |
| 2023/0267871 A1* | 8/2023 | Zhang | G09G 3/2096 |
| | | | 345/204 |
| 2023/0290296 A1* | 9/2023 | Henzen | G09G 3/2096 |
| 2023/0367419 A1* | 11/2023 | Seo | G06F 3/04166 |
| 2023/0368714 A1* | 11/2023 | Sharma | G09G 5/393 |
| 2024/0013704 A1* | 1/2024 | Kim | G09G 3/2096 |
| 2024/0046842 A1* | 2/2024 | Lee | G09G 3/3225 |
| 2024/0169953 A1* | 5/2024 | Marchya | G09G 5/006 |

FOREIGN PATENT DOCUMENTS

| | | |
|---|---|---|
| CN | 105185284 A | 12/2015 |
| CN | 105225627 A | 1/2016 |
| CN | 108449566 A | 8/2018 |
| CN | 109196578 A | 1/2019 |
| CN | 110444155 A | 11/2019 |
| CN | 110520819 A | 11/2019 |
| WO | 2019014042 A1 | 1/2019 |

OTHER PUBLICATIONS

Supplementary European Search Report—EP20919778—Search Authority—Munich—Sep. 8, 2023.

* cited by examiner

REDUCED DISPLAY PROCESSING UNIT TRANSFER TIME TO COMPENSATE FOR DELAYED GRAPHICS PROCESSING UNIT RENDER TIME

CROSS REFERENCE TO RELATED APPLICATION(S)

This application is National Stage Application filed under 35 U.S.C. § 371 of PCT International Application No. PCT/CN2020/076205, entitled "REDUCED DISPLAY PROCESSING UNIT TRANSFER TIME TO COMPENSATE FOR DELAYED GRAPHICS PROCESSING UNIT RENDER TIME" and filed Feb. 21, 2020, which is expressly incorporated by reference herein in its entirety.

BACKGROUND

Technical Field

The present disclosure relates generally to processing systems, and more particularly, to one or more techniques for display and/or graphics processing.

Introduction

Computing devices often perform graphics processing (e.g., utilizing a graphics processing unit (GPU)) to render graphical data for display by the computing devices. Such computing devices may include, for example, computer workstations, mobile phones such as smartphones, embedded systems, personal computers, tablet computers, and video game consoles. GPUs are configured to execute a graphics processing pipeline that includes one or more processing stages which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A device that provides content for visual presentation on a display may utilize a GPU.

In some cases, a GPU may render frames at variable rates, which may result in a dropped frame by a frame processor. Accordingly, there is a need for improved frame transfer techniques in view of a variable frame rendering rate.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Display content processing techniques may be performed over at least two processing stages, for example: (1) GPU rendering; and (2) frame transfer/display. GPU rendering of a frame N+1 may be performed concurrently with transfer of a previous frame N to a physical display panel. In cases where the GPU rendering of the frame N+1 exceeds a vertical synchronization ($V_{SYNC}$) time interval, variable refresh rate technology such as a Qualcomm® synchronization ($Q_{SYNC}$) feature may be executed to extend a length of the frame time to prevent the frame N from being repeatedly displayed over two consecutive frame times. While extending a frame time may allow slightly more time for GPU rendering, enabling a variable refresh rate feature may result in a variable frame per second (FPS) processing rate that may lead to frame drop-offs in later frames based on display processing unit (DPU) hardware configurations.

Accordingly, when a length of a first frame is extended by variable refresh rate feature, a second frame that follows the first frame may be shortened by a same length as that by which the first frame was extended in order to compensate for the extension of the first frame and maintain a stable FPS processing rate over a plurality of frames. More specifically, after completion of rendering of the second frame, the DPU may determine whether the first frame is currently transferring to a display panel or has already been transferred to the display panel, where the first frame still currently transferring to the display panel after completion of rendering the second frame indicates that the GPU rendering finished within an initial $V_{SYNC}$ time interval, and where the first frame having already been transferred to the display panel prior to completion of rendering the second frame indicates that the GPU rendering of the second frame was delayed beyond the initial $V_{SYNC}$ time interval. When the first frame is determined to be currently transferring, at least one clock is maintained at a default set of clock speeds for transferring the second frame to the display panel. Alternatively, when the first frame is determined to have already been transferred, the at least one clock is accelerated via a second set of clocks speeds configured to complete the transfer of the second frame within the shortened time period and compensate for the extended time period/delay of the previous frame.

In an aspect of the disclosure, a method, a computer-readable medium, and an apparatus for frame processing are provided. The apparatus may be configured to determine whether a first frame is currently transferring or has been transferred after completion of a rendering of a second frame, the second frame following the first frame. The apparatus may be further configured to use, with at least one clock, a first set of clock speeds when the first frame is determined to be currently transferring and a second set of clock speeds when the first frame is determined to have been transferred, the second set of clock speeds being faster than the first set of clock speeds. The second frame is transferred based on the used set of clock speeds after completion of the transfer of the first frame.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
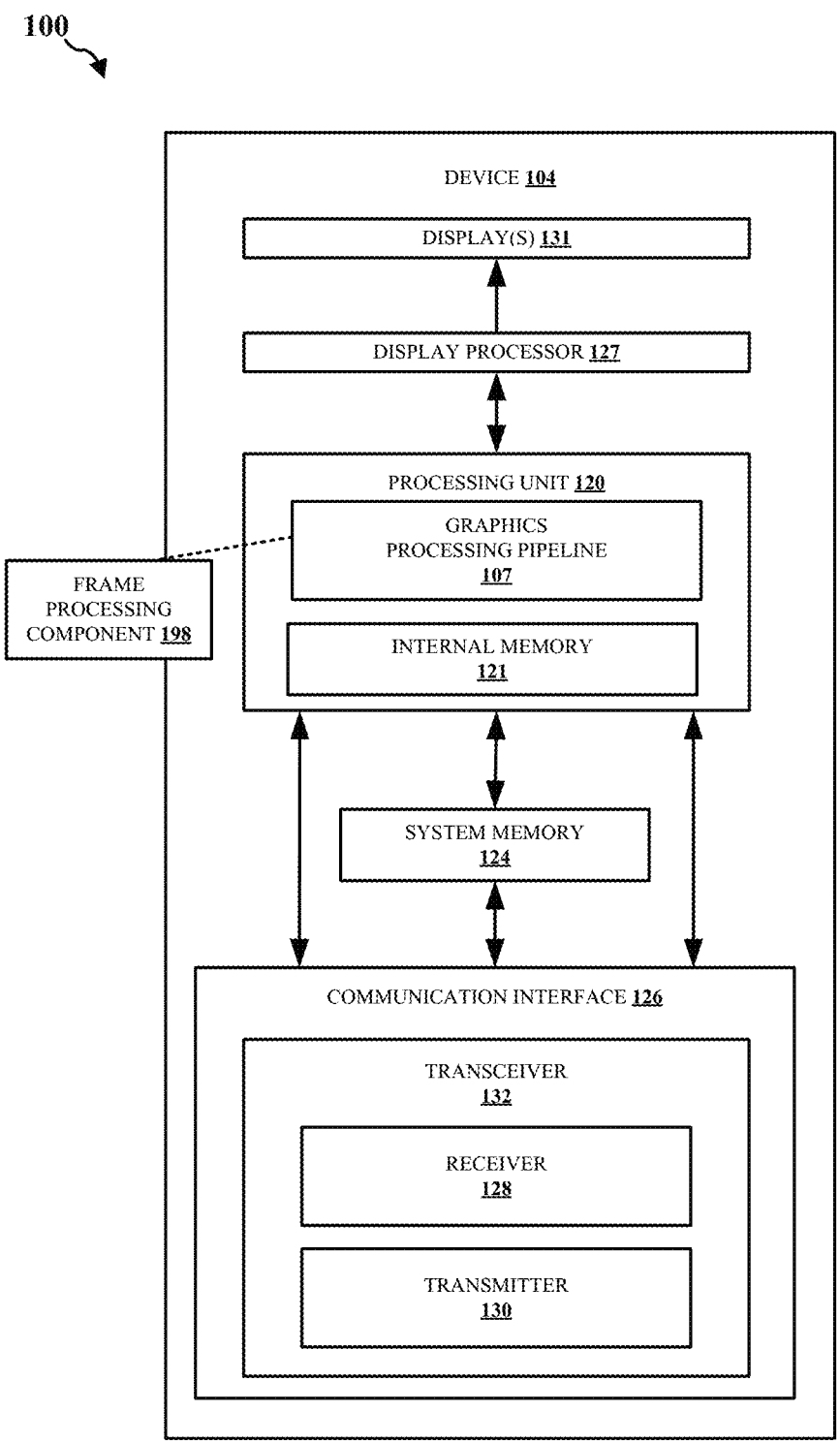
FIG. 1 is a block diagram that illustrates an example content generation system in accordance with one or more techniques of this disclosure.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

The term application may refer to software. As described herein, one or more techniques may refer to an application (e.g., software) being configured to perform one or more functions. In such examples, the application may be stored in a memory (e.g., on-chip memory of a processor, system memory, or any other memory). Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, this disclosure describes techniques for graphics processing in a single device or multiple devices that may improve the rendering of graphical content and/or reduce the load of a processing unit (e.g., any processing unit configured to perform one or more techniques described herein, such as a GPU). For example, this disclosure describes techniques applicable to graphics processing in any device that utilizes a graphics processor. Other potential advantages of such techniques are described throughout this disclosure.

As used herein, instances of the term "content" may refer to "graphical content," an "image," etc., regardless of whether the terms are used as an adjective, noun, or other parts of speech. In some examples, the term "graphical content," as used herein, may refer to a content produced by one or more processes of a graphics processing pipeline. In further examples, the term "graphical content," as used herein, may refer to a content produced by a processing unit configured to perform graphics processing. In still further examples, as used herein, the term "graphical content" may refer to a content produced by a graphics processing unit.

In examples, the term "display content," as used herein, may refer to content generated by a processing unit configured to perform display processing. In further examples, the term "display content," as used herein, may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling (e.g., upscaling or downscaling) on a frame. In some examples, a frame may refer to a layer. In other examples, a frame may refer to two or more layers that have already been blended together to form the frame when the frame includes two or more layers. Alternatively, a frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of a SOC. The device 104 may include one or more components configured to perform one or more techniques of this disclosure. In the example shown, the device 104 may include a processing unit 120, and a system memory 124. In some aspects, the device 104 may include a number of optional components (e.g., a communication interface 126, a transceiver 132, a receiver 128, a transmitter 130, a display processor 127, and one or more displays 131). Display(s) 131 may refer to one or more displays 131. For example, the display 131 may include a single display or multiple displays, which may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing using a graphics processing pipeline 107. In some examples, the device 104 may include a display processor, such as the display processor 127, to perform one or more display processing techniques on one or more frames generated by the processing unit 120 before being displayed by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of a liquid crystal display (LCD), a plasma display, an organic light emitting diode (OLED) display, a projection display device, an augmented reality display device, a virtual reality display device, a head-mounted display, or any other type of display device.

Memory external to the processing unit 120, such as system memory 124, may be accessible to the processing unit 120. For example, the processing unit 120 may be configured to read from and/or write to external memory, such as the system memory 124. The processing unit 120 may be communicatively coupled to the system memory 124 over a bus. In some examples, the processing unit 120 may be communicatively coupled to the internal memory 121 over the bus or via a different connection. The internal memory 121 or the system memory 124 may include one or more volatile or non-volatile memories or storage devices. In some examples, internal memory 121 or the system memory 124 may include RAM, static random access memory (SRAM), dynamic random access memory (DRAM), erasable programmable ROM (EPROM), EEPROM, flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a CPU, a GPU, GPGPU, or any other processing unit that may be configured to perform graphics processing. In some examples, the processing unit 120 may be integrated into a motherboard of the device 104. In further examples, the processing unit 120 may be present on a graphics card that is installed in a port of the motherboard of the device 104, or may be otherwise incorporated within a peripheral device configured to interoperate with the device 104. The processing unit 120 may include one or more processors, such as one or more microprocessors, GPUs, ASICs, FPGAs, arithmetic logic units (ALUs), DSPs, discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

In some aspects, the content generation system 100 can include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the graphics processing pipeline 107 may include a frame processing component 198 configured to determine whether a first frame is currently transferring or has been transferred after completion of rendering a second frame, the second frame following the first frame; use, with at least one clock, a first set of clock speeds when the first frame is determined to be currently transferring and a second set of clock speeds when the first frame is determined to have been transferred, the second set of clock speeds being faster than the first set of clock speeds; and transfer the second frame based on the used set of clock speeds after completion of the transfer of the first frame.

A device, such as the device 104, may refer to any device, apparatus, or system configured to perform one or more techniques described herein. For example, a device may be a server, a base station, a user equipment, a client device, a station, an access point, a computer such as a personal computer, a desktop computer, a laptop computer, a tablet computer, a computer workstation, or a mainframe computer, an end product, an apparatus, a phone, a smart phone, a server, a video game platform or console, a handheld device such as a portable video game device or a personal digital assistant (PDA), a wearable computing device such as a smart watch, an augmented reality device, or a virtual reality device, a non-wearable device, a display or display device, a television, a television set-top box, an intermediate network device, a digital media player, a video streaming device, a content streaming device, an in-vehicle computer, any mobile device, any device configured to generate graphical content, or any device configured to perform one or more techniques described herein. Processes herein may be described as performed by a particular component (e.g., a GPU) but in further embodiments, can be performed using other components (e.g., a CPU) consistent with the disclosed embodiments.

Figure 2:
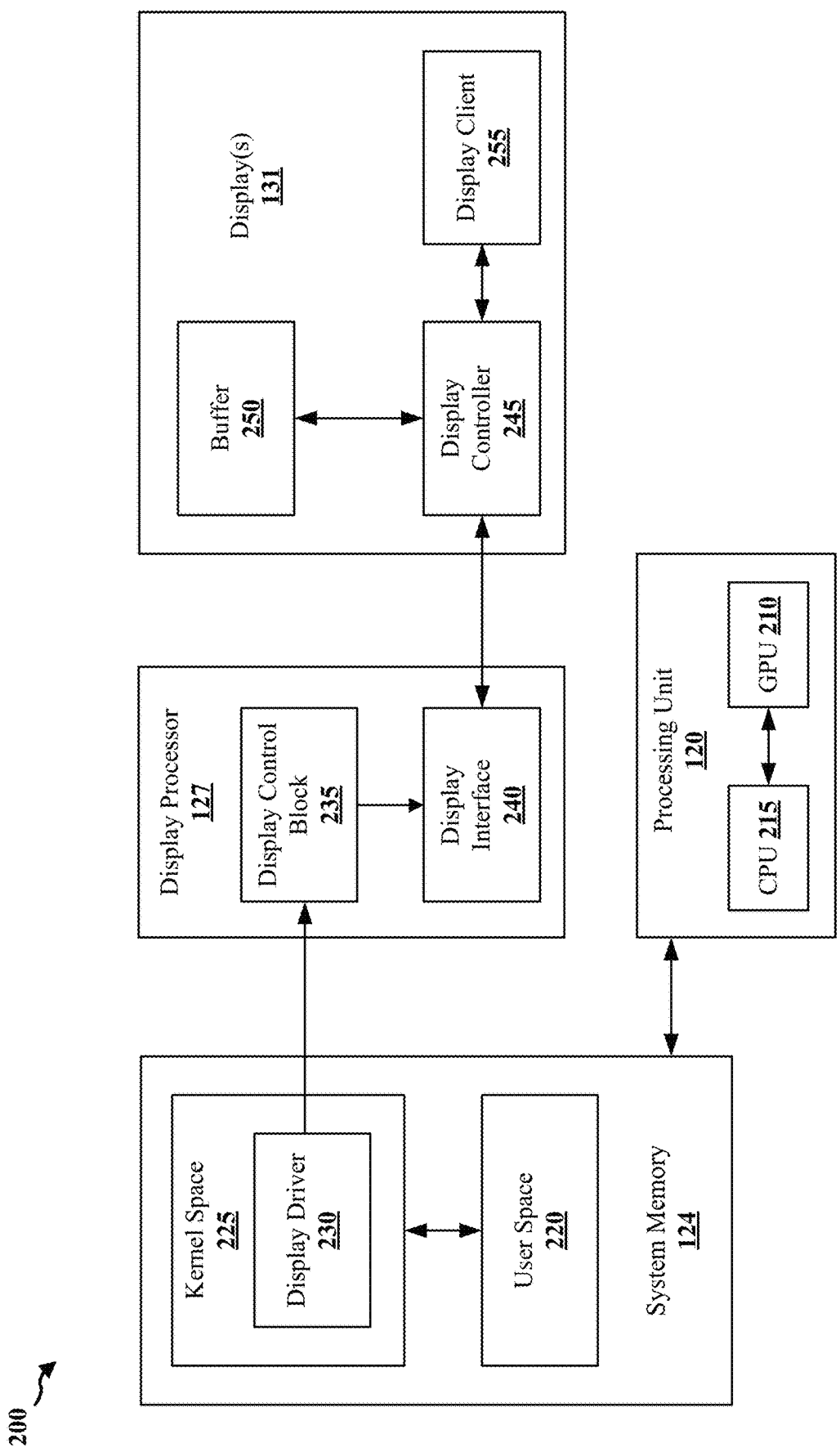
FIG. 2 illustrates an example GPU in accordance with one or more techniques of this disclosure.

FIG. 2 is a block diagram 200 that illustrates an example display framework including the processing unit 120, the system memory 124, the display processor 127, and the display(s) 131, as may be identified in connection with the exemplary device 104.

A GPU is generally included in devices that provide content for visual presentation on a display. For example, the processing unit 120 may include a GPU 210 configured to render graphical data for display on a computing device (e.g., the device 104), which may be a computer workstation, a mobile phone, a smartphone or other smart device, an embedded system, a personal computer, a tablet computer, a video game console, and the like. Operations of the GPU 210 may be controlled based on one or more graphics processing commands provided by a CPU 215. The CPU 215 may be configured to execute multiple applications concurrently. In some cases, each of the concurrently executed multiple applications may utilize the GPU 210 simultaneously. Processing techniques may be performed via the processing unit 120 output a frame over physical or wireless communication channels.

The system memory 124, which may be executed by the processing unit 120, may include a user space 220 and a kernel space 225. The user space 220 (sometimes referred to as an "application space") may include software application(s) and/or application framework(s). For example, software application(s) may include operating systems, media applications, graphical applications, workspace applications, etc. Application framework(s) may include frameworks used by one or more software applications, such as libraries, services (e.g., display services, input services, etc.), application program interfaces (APIs), etc. The kernel space 225 may further include a display driver 230. The display driver 230 may be configured to control the display processor 127. For example, the display driver 230 may cause the display processor 127 to change a display rate (e.g., in frames per second (FPS)) of generated frames.

The display processor 127 includes a display control block 235 and a display interface 240. The display processor 127 may be configured to manipulate functions of the display(s) 131 (e.g., based on an input received from the display driver 230). For instance, the display control block 235 may be configured to receive instructions from the display driver 230 to change the FPS display rate of the display(s) 131. The display control block 235 may be further configured to output image frames to the display(s) 131 via the display interface 240 based on a display refresh rate determined by the display driver 230. The display driver 230 may output refresh rate information indicating a new display refresh rate/change to a current display refresh rate. The display control block 235 may receive the refresh rate information and cause the display interface 240 to output image frames to the display(s) 131 based on the refresh rate information. In some examples, the display control block 235 may additionally or alternatively perform post-processing of image data provided based on execution of the system memory 124 by the processing unit 120.

The display interface 240 may be configured to cause the display(s) 131 to display image frames and/or establish a particular display rate at which the display(s) 131 display the image frames (e.g., a particular FPS display rate). The display interface 240 may output image data to the display(s) 131 according to an interface protocol, such as, for example, the MIPI DSI (Mobile Industry Processor Interface, Display Serial Interface). That is, the display(s) 131, may be configured in accordance with MIPI DSI standards. The MIPI DSI standard supports a video mode and a command mode. In examples where the display(s) 131 is/are operating in video mode, the display processor 127 may continuously refresh the graphical content of the display(s) 131. For example, the entire graphical content may be refreshed per refresh cycle (e.g., line-by-line). In examples where the display(s) 131 is/are operating in command mode, the display processor 127 may write the graphical content of a frame to a buffer 250.

In some such examples, the display processor 127 may not continuously refresh the graphical content of the display(s) 131. Instead, the display processor 127 may use a vertical synchronization ($V_{SYNC}$) pulse to coordinate rendering and consuming of graphical content at the buffer 250. For example, when a $V_{SYNC}$ pulse is generated, the display processor 127 may output new graphical content to the buffer 250. Thus, generation of the $V_{SYNC}$ pulse may indicate that current graphical content has been rendered at the buffer 250. It should also be appreciated, however, that generation of the $V_{SYNC}$ pulse may be indicative of a time period that is based on, for example, the current FPS display rate of the display(s) 131.

Frames are displayed at the display(s) 131 based on a display controller 245, a display client 255, and the buffer 250. The display controller 245 may receive image data from the display interface 240 and store the received image data in the buffer 250. In some examples, the display controller 245 may output the image data stored in the buffer 250 to the display client 255. Thus, the buffer 250 may represent a local memory to the display(s) 131. In some examples, the display controller 245 may output the image data received from the display interface 240 directly to the display client 255. It should be further appreciated that determining whether to change the FPS display rate of the display(s) 131 may be performed by the display controller 245, the display control block 235, and/or the display driver 230.

The display client 255 may be associated with a touch panel that senses interactions between a user and the display(s) 131. As the user interacts with the display(s) 131, one or more sensors in the touch panel may output signals to the display controller 245 that indicate which of the one or more sensors have sensor activity, a duration of the sensor activity, an applied pressure to the one or more sensor, etc. The display controller 245 may use the sensor outputs to determine a manner in which the user has interacted with the display(s) 131. The display(s) 131 may be further associated with/include other devices, such as a camera, a microphone, and/or a speaker, that operate in connection with the display client 255.

Some processing techniques of the device 104 may be performed over three stages (e.g., stage 1: a rendering stage; stage 2: a composition stage; and stage 3: a display/transfer stage). However, other processing techniques may combine the composition stage and the display/transfer stage into a single stage, such that the processing technique may be executed based on two total stages (e.g., stage 1: the rendering stage; and stage 2: the composition/display/transfer stage). During the rendering stage, the GPU 210 may process a content buffer based on execution of an application that generates content on a pixel-by-pixel basis. During the composition and display stage(s), pixel elements may be assembled to form a frame that is transferred to a physical display panel/subsystem (e.g., the displays 131) that displays the frame.

In order to maintain a constant frame per second (FPS) transfer rate of the frames to the physical display panel/subsystem, the stages of the processing pipeline may be performed based on a constant period of time. In some instances, the period of time may be controlled by a desired FPS transfer rate of the frames. For example, a 60 Hz FPS display panel having a 16.6 ms frame time may need to complete the stages of the processing pipeline within 16.6 ms to prevent frame drop-off, whereas a 120 Hz FPS display panel having an 8.3 ms frame time may need to complete the stages of the processing pipeline within 8.3 ms to prevent frame drop-off. More specifically, in order to ensure that content is being display smoothly by the display panel/subsystem, the time period over which the processing pipeline is executed should be less than or equal to the frame time of the display panel/subsystem. If the total time required to complete the stages of the processing pipeline exceeds the frame time of the display panel, frame drop-off may cause an un-smoothness/perceptible pause in the displayed content.

Figure 3:
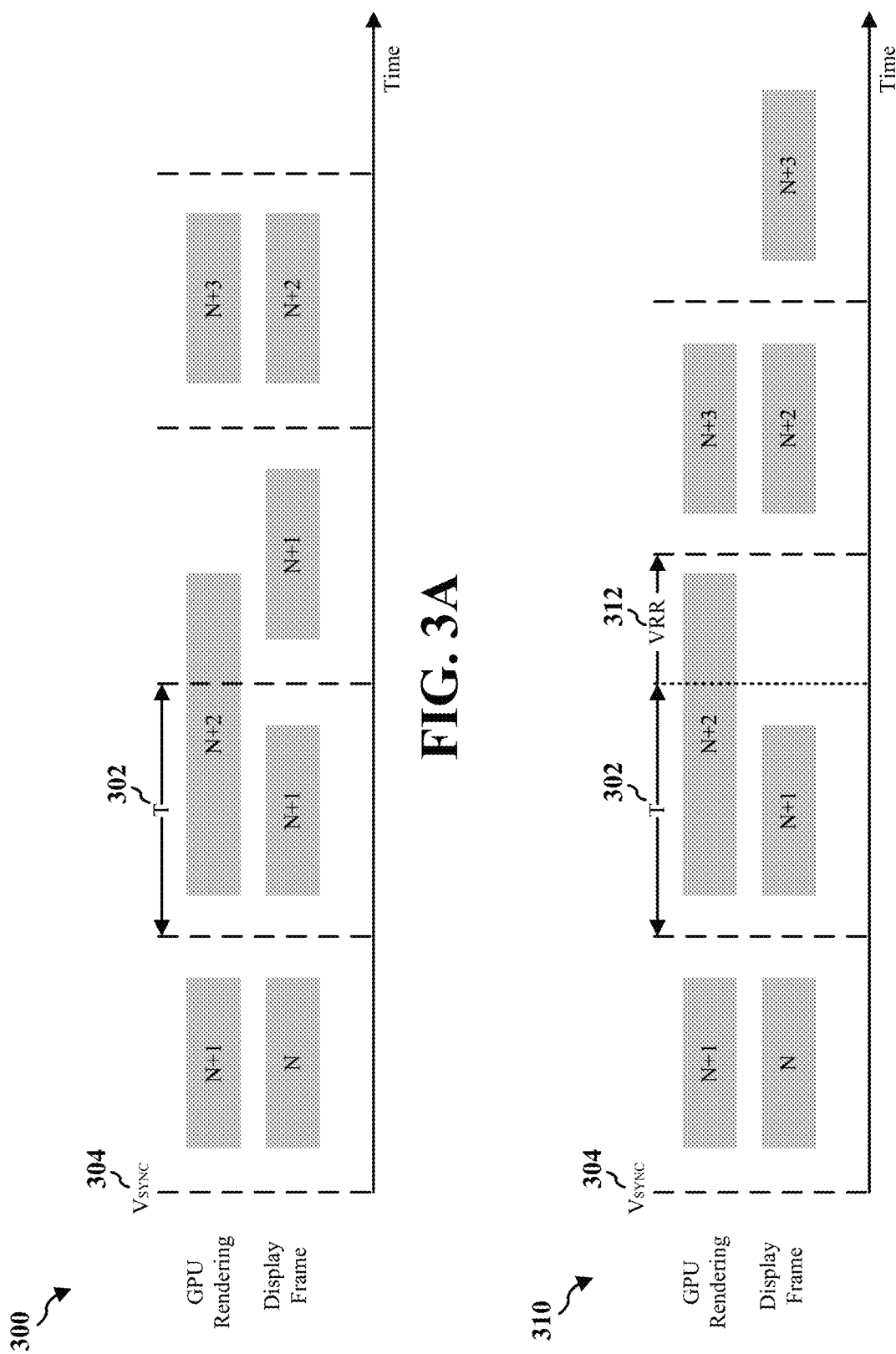
FIGS. 3A-3B illustrate the impact of enabling a variable refresh rate feature to extend a length of a frame.

FIGS. 3A-3B illustrate the impact of enabling a variable refresh rate (VRR) feature 312, such as a $Q_{SYNC}$ feature, to extend a length of a frame. Variable refresh rate technologies are configured to perform frame updates at a rate that may vary on the fly. An associated display may keep the display rate in sync with the rate at which frames are being received to thereby reduce stutters and/or tears of the frames that may otherwise be caused by the varying frame rate. In aspects of a frame processing technique, the GPU may render a frame N+1 at a same time that the DPU displays/transfers a frame N to the display panel. In diagram 300, rendering of frame N+2 takes longer than period T 302, which may correspond to a $V_{SYNC}$ time 304 and/or the frame time of the display panel. For example, the period T 302 may be set at 16.6 ms or 8.3 ms depending on a configuration of the display panel. Since the rendering of frame N+2 extends beyond the frame time and into a subsequent frame, a DPU may repeat frame N+1 for two consecutive frames and delay transfer of frame N+2 to a following frame in which rendering of frame N+3 is to begin. Frame drop-off caused by delaying the transfer of frame N+2 to the following frame may cause a perceptible pause in the displayed content known as a jank.

In order to reduce janks caused by the GPU rendering a frame too slowly and exceeding the frame time, diagram 310 introduces the variable refresh rate feature 312 to extend a length of the frame time for a respective frame. That is, when rendering of a frame is not expected to finish within the initial frame time, the variable refresh rate feature 312 provides flexibility to replace a previously-fixed frame time with an extended frame time by increasing the $V_{SYNC}$ time 304. While extending the frame time may allow slightly more time to render a frame, a variable $V_{SYNC}$ time 304 may cause the FPS transfer rate to become variable as well and lead to other frame drop-offs in later frames based on DPU hardware configurations. Accordingly, a stable FPS transfer rate may further improve how the frames are perceived visually by an end user.

Without the variable refresh rate feature 312 enabled, the FPS transfer rate is generally a fixed value for each respective frame. For example, the FPS transfer rate may be fixed at 16.6 ms for a 60 Hz display panel. However, with the variable refresh rate feature 312 enabled the FPS transfer rate may change dynamically based on the frame render time of the GPU. For instance, frame N+1 may be initially set to 16.6 ms, frame N+2 may be extended to 20 ms, and frame N+3 may be changed to some other value. The DPU is then tasked with manipulating a refresh rate of the display panels based on the length of each respective frame. Thus, if a frame render time costs 20 ms, the variable refresh rate feature 312 may extend the frame from 16.6 ms to 20 ms in order to compensate for the additional time costs to thereby prevent jank issues. Conversely, if the frame render time only costs 15 ms, the variable refresh rate feature 312 does not need to manipulate the 16.6 ms frame, as rendering may be performed by the GPU within the frame time. As previously-noted, a variable FPS transfer rate may lead to some frame drop-offs in later frames. However, the impact of the frame drop-offs on the displayed content is less substantial than that which would otherwise result from jank.

Figure 4:
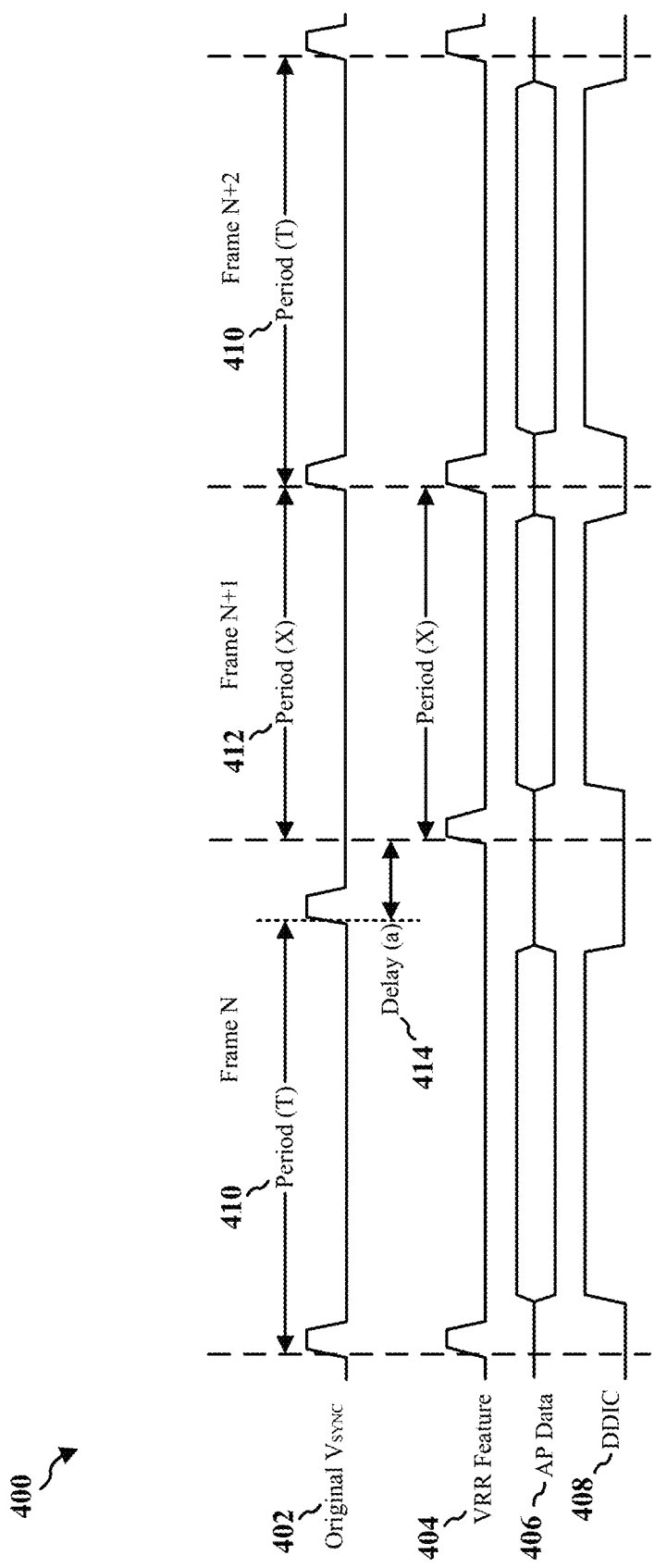
FIG. 4 illustrates a video mode timing diagram in which a transfer time by a DPU is reduced to compensate for a long rendering time by a GPU.

FIG. 4 illustrates a video mode timing diagram 400 in which a transfer time by the DPU is reduced to compensate for an extended rendering time by the GPU. The reduced transfer time is configured to maintain a stable FPS transfer rate, even for gaming applications that place a heavy demand on the graphics processing pipeline. In an aspect, a display serial interface (DSI) clock may be dynamically changed to accelerate the display/transfer time and/or the composition time when the variable refresh rate feature 404 takes effect to extend a frame, so that data stream processing can be maintained at a stable FPS rate of processing. That is, one or more clocks may be accelerated to increase the display/transfer time and/or the composition time when rendering of a previous frame by the GPU takes longer than the initial frame time.

In the video mode timing diagram 400, the initial frame time is represented by period T 410. When each of the three frames N, N+1, and N+2 in diagram 400 have a length of period T 410 according to the original $V_{SYNC}$ 402, the data stream is processed at a constant FPS rate. However, when the variable refresh rate feature 404 takes effect, a duration of frame N is extended by delay "a" 414 to a duration of T+a. Under conventional approaches this may cause the FPS to change due to frame N having a longer length than each of frames N+1 and N+2. Accordingly, one or more clocks may be accelerated to reduce the transfer time of the application data (AP data) 406 in frame N+1 to shorten the length of frame N+1 to period X 412. Period X 412 may be equal to T−a in order to maintain a stable FPS processing rate. Specifically, the processing rate in FPS over periods T+a, T−a, and T is the same FPS processing rate as when all three frames N, N+1, and N+2 each have a period of T 410. Further, an execution time of the data dictionary (DDIC) 408 may also be reduced in frame N+1 based on the period X 412.

The diagram 400 may be implemented with respect to both video mode panels and/or command mode panels. In an aspect, the DPU may be switched from a command mode panel to a video mode panel to provide a stable FPS processing rate when a high frame rate is detected, such as detection of a high frame rate during execution of gaming applications.

For each frame commit, a DPU line counter may be compared to a vertical total ($V_{TOTAL}$) number of lines when GPU rendering of a frame is completed to determine whether a data transfer is also completed. $V_{TOTAL}$ represents a total number of display lines (e.g., lines 1 to L) in a display panel/subsystem. The display panel/subsystem may be divided line-by-line into active lines and inactive lines (e.g., vertical black ($V_{BLACK}$)) lines and counted by the line counter. $V_{TOTAL}$ may be equal to the total number of active and inactive lines. For example, a smartphone may have 1,988 active lines and 20 inactive/$V_{BLACK}$ lines for a $V_{TOTAL}$ of 2,008 lines. Other platforms may have a different configuration (e.g., 2,020 active lines and 10 inactive lines for a $V_{TOTAL}$ of 2,030 lines). The DPU line count increases as the DPU processes a frame line-by-line and may be equal to $V_{TOTAL}$ in some configurations. The DPU line counter may be reset after completion of rendering a frame.

Since the DPU line counter is compared to $V_{TOTAL}$ at the completion of rendering a frame (e.g., frame N+1), a line count less than $V_{TOTAL}$ at that time indicates that a data transfer of the prior frame (e.g., frame N) is still in progress. This means that GPU rendering of the current frame has finished in time (e.g., within the period T 410) and that default DSI clocks, mobile display processor (MDP) clocks, and other default settings may be maintained for the data transfer and/or composition in a subsequent frame. However, the DPU line count being greater than $V_{TOTAL}$ at the completion of rendering the frame is indicative of the variable refresh rate feature 404 taking effect to extend the frame. This means that GPU rendering of the current frame did not finish in time (e.g., within the period T 410) and that one or more of the clocks should be accelerated for the subsequent frame to reduce the frame transfer time and/or composition time to period X 412, which thereby compensates for the delay a 414 included in the extended GPU render time.

A length of the delay a 414 may be identified via the DPU line counter, the one or more DSI clocks, and/or other timing parameters. In particular, the period X 412 may be equal to the period T 410 minus the delay a 414. That is, if GPU rendering costs extra time (e.g., 2 ms) beyond period T 410, the DPU may reduce the transfer time by a same amount of time (e.g., 2 ms) to compensate for the added rendering costs. The new period (e.g., the period X 412, which is equal to T−a) for the subsequent frame is utilized along with a panel resolution and other DSI timing parameters (e.g., vertical porches and horizontal porches) to determine adjustments for one or more clocks, such as a DSI bit clock, a pixel clock, or a byte clock. Such adjustments are implemented to ensure that the DPU transfer time and/or composition time can be performed according to the new period. For instance, a DSI clock may be accelerated while maintaining other current DSI timing parameters, such as the vertical porches, the horizontal porches, and/or an active frame region. An MDP core clock and other related clocks may be accelerated to match the accelerated DSI clock.

Figure 5:
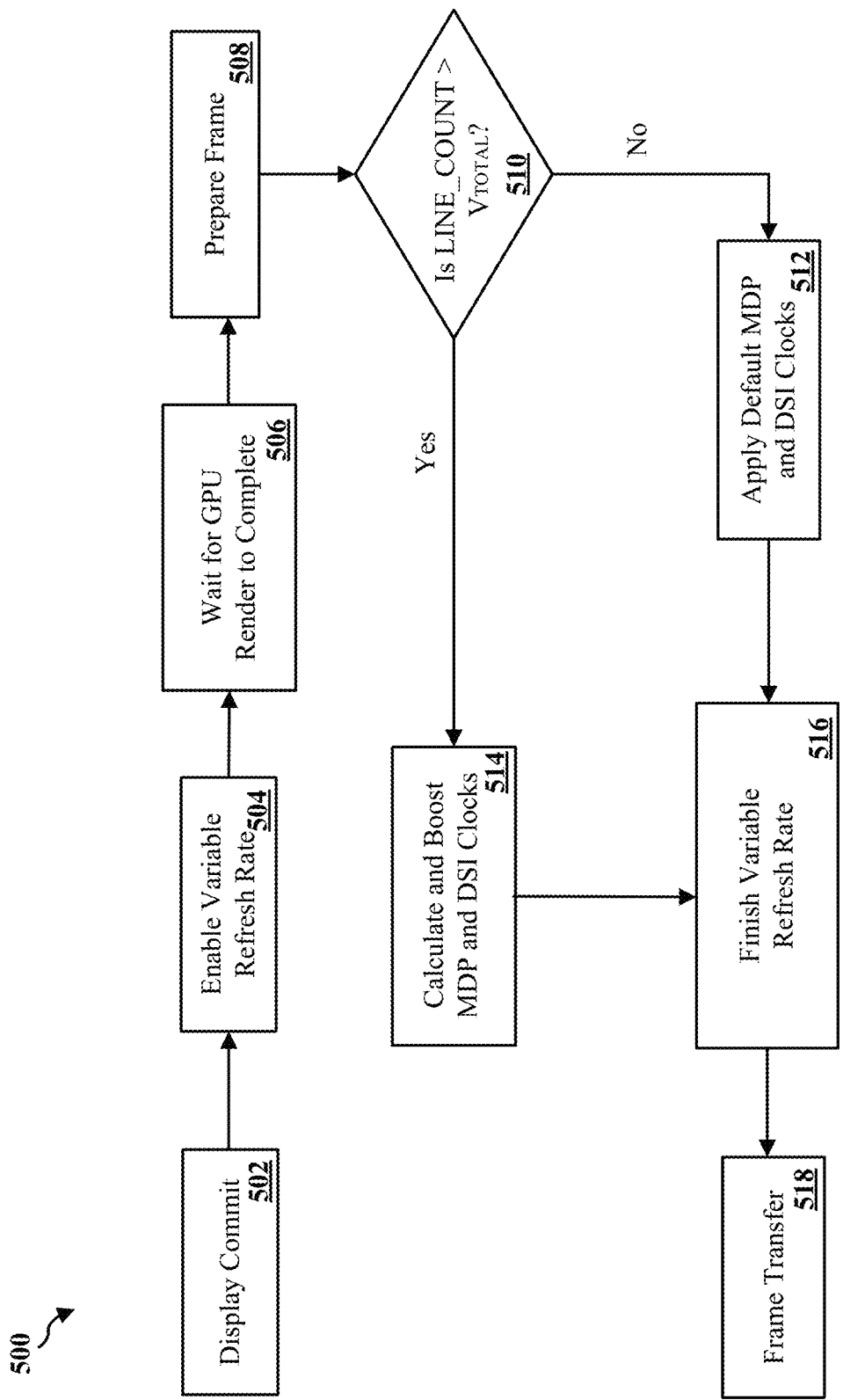
FIG. 5 is a flow diagram that illustrates determining whether one or more clocks need to be accelerated for reducing a transfer time of a frame.

FIG. 5 is a flow diagram 500 that illustrates determining whether one or more clocks should be accelerated to reduce a transfer time of a frame. At 502, a display commit is generated that finalizes the frame for rendering by the GPU. More specifically, the display commit makes one or more tentative changes to data utilized for generating the frame permanent prior to rendering the frame (e.g., via the display commit 502 the GPU is "committed" to the act of rendering the frame). At 504, the variable refresh rate feature is enabled. For example, a time required by the GPU to render the frame may exceed the current frame time, thereby causing the variable refresh rate feature to activate and extend the frame time. At 506, the processing system waits for frame rendering by the GPU to complete so that, at 508, the processing system may prepare the frame for transfer to a display panel. For example, at 508, a DPU may compose one or more rendered layers of the frame, such as by assembling pixel elements to form the frame.

At 510, the processing system determines whether a LINE_COUNT is greater than $V_{TOTAL}$. In an aspect, a line counter that outputs the LINE_COUNT may be hardware that is reset to an initial value after completion of each frame in a data stream. In another aspect, the initial value of the LINE_COUNT may be based on a start of a first line of each frame in the data stream, where the LINE_COUNT continually increases with each line. If the LINE_COUNT is not greater than $V_{TOTAL}$, in some embodiments, the variable refresh rate feature is free to operate as intended without any adjustments to the DPU transfer time. That is, at 512, the default MDP and DSI clocks are utilized for transferring the frame.

However, if the LINE_COUNT is greater than $V_{TOTAL}$, the variable refresh rate feature may extend the frame due to slow rendering of the frame by the GPU. Hence, at 514, a boosted/accelerated time for the MDP and DSI clocks is calculated for transferring the frame. While the default clock speeds may be based on a fixed frame time of the physical display panel, the accelerated clock speeds may be based on the GPU render time. For example, when the GPU render time of frame N+1 is shortened from time T to T−a because the GPU render time of the previous frame N took longer than the time T, the clocks may be sped up to a rate that allows frame N+1 to transfer to the display panel within the shorted timeframe T−a. In either case, the variable refresh rate feature finishes at 516 and, at 518, the frame is transferred to the physical display panel for display thereof.

Figure 6:
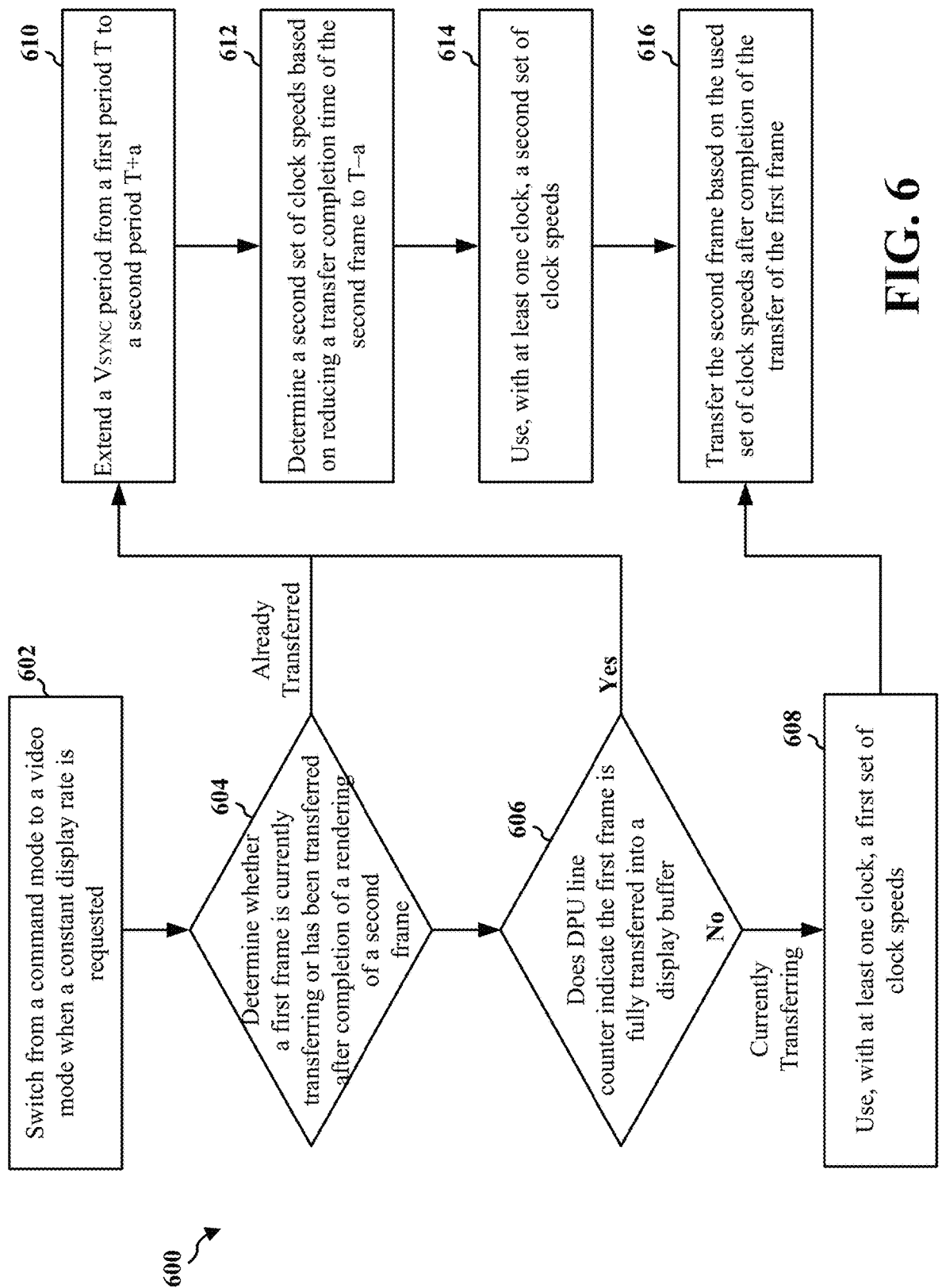
FIG. 6 is a flowchart of an example method in accordance with one or more techniques of this disclosure.

FIG. 6 is a flowchart 600 of an example method in accordance with one or more techniques of this disclosure. The method 600 may be performed by a frame composer, a display processor, a DPU, a GPU, an apparatus for graphics processing, a wireless communication device, and the like, as used in connection with the examples of FIGS. 1-5.

At 602, a frame processor may switch from a command mode to a video mode when a constant display rate is requested. For example, referring to FIG. 4, the frame processor may switch to a video mode represented by the video mode timing diagram 400 after receiving a request for a constant display rate while in a command mode (e.g., based on detection of a high frame rate, launch of a high frame rate application, manual input from a user, etc.).

At 604, the frame processor may determine whether a first frame is currently transferring or has been transferred after completion of a rendering of a second frame, where the second frame follows the first frame. For example, referring to FIG. 4, the frame processor may determine whether frame N of the video mode timing diagram 400 has been extended to T+a by the variable refresh rate feature 404, where the delay a 414 is indicative of frame N already having been transferred to a display panel by the time that rendering of frame N+1 is completed; or whether the length of frame N is maintained at period T 410 (e.g., without the delay a 414), where a length of period T 410 is indicative of frame N still currently transferring to the display panel. Thus, in aspects, the frame processor may determine whether the first frame is currently transferring or has been transferred based on whether the DSI clock has measured a delay.

At 606, determining whether the first frame is currently transferring or has been transferred may further comprise determining whether a DPU line counter indicates that the first frame is being transferred into a display buffer or has been fully transferred into the display buffer. For example, referring to FIG. 5, if the frame processor determines that the LINE_COUNT is greater than $V_{TOTAL}$ at 510, the indication is that the frame N has already been fully transferred into the buffer, which further indicates that that frame N has already been transferred to the display panel. Alternatively, if the frame processor determines that the LINE_COUNT is less than $V_{TOTAL}$ at 510, the indication is that the frame N has not been fully transferred into the buffer, which further indicates that the frame N is currently transferring to the display panel.

At 608, when the first frame is determined to be currently transferring, at least one clock may be used with a first set of clock speeds. The at least one clock may comprise at least one of a DSI clock or a MDP clock. For example, referring to FIG. 5, if the frame processor determines that the LINE_COUNT is less than $V_{TOTAL}$ at 510, the frame processor may apply default MDP and DSI clocks at 512. That is, the first set of clock speeds may be a set of default clock speeds that provides for transfer of a frame within a first period T.

At 610, when the first frame has already transferred, the $V_{SYNC}$ period may be extended from a first period T to a second period T+a. Based on the second period T+a, the at least one clock may be used with a second set of clock speeds that is faster than the first set of clock speeds. For example, referring to FIG. 4, the variable refresh rate feature 404 may extend the original $V_{SYNC}$ 402 by delay a 414, where the original $V_{SYNC}$ 402 provided an initial period of T 410 for the frame N. Since the extended period T+a is longer than the period T 410, the set of clock speeds may need to be accelerated for frame N+1 to maintain a stable FPS processing rate.

At 612, the second set of clock speeds may be determined based on reducing a transfer completion time of the second frame in order to provide a transfer of the second frame within a third period T−a. For example, referring to FIG. 4, the frame processor may determine the second set of clock speeds based on reducing the transfer completion time of frame N+1 to period X 412, where period X 412 is equal to T−a.

At 614, when the first frame is determined to have been already transferred, the at least one clock may be used with a second set of clock speeds, where the second set of clock speeds is faster than the first set of clock speeds. For example, referring to FIG. 5, if the frame processor determines that the LINE_COUNT is greater than $V_{TOTAL}$ at 510, the frame processor may calculate and boost (e.g., increase a rate of) the MDP and DSI clocks at 514. That is, the second set of clock speeds may be a set of accelerated clock speeds that provides for transfer of a frame within the third period T−a. The second set of clock speeds may be based on a variable refresh rate of the second frame.

At 616, the frame processor may transfer the second frame based on the used set of clock speeds after completion of the transfer of the first frame. That is, block 616 may be performed based on either the first set of clock speeds or the second set of clock speeds. For example, referring to FIG. 5, the frame processor transfers the frame at 518 when the variable refresh rate feature has finished at 516 based on either the default MDP and DSI clocks applied at 512 or the boosted MDP and DSI clocks at 514.

Figure 7:
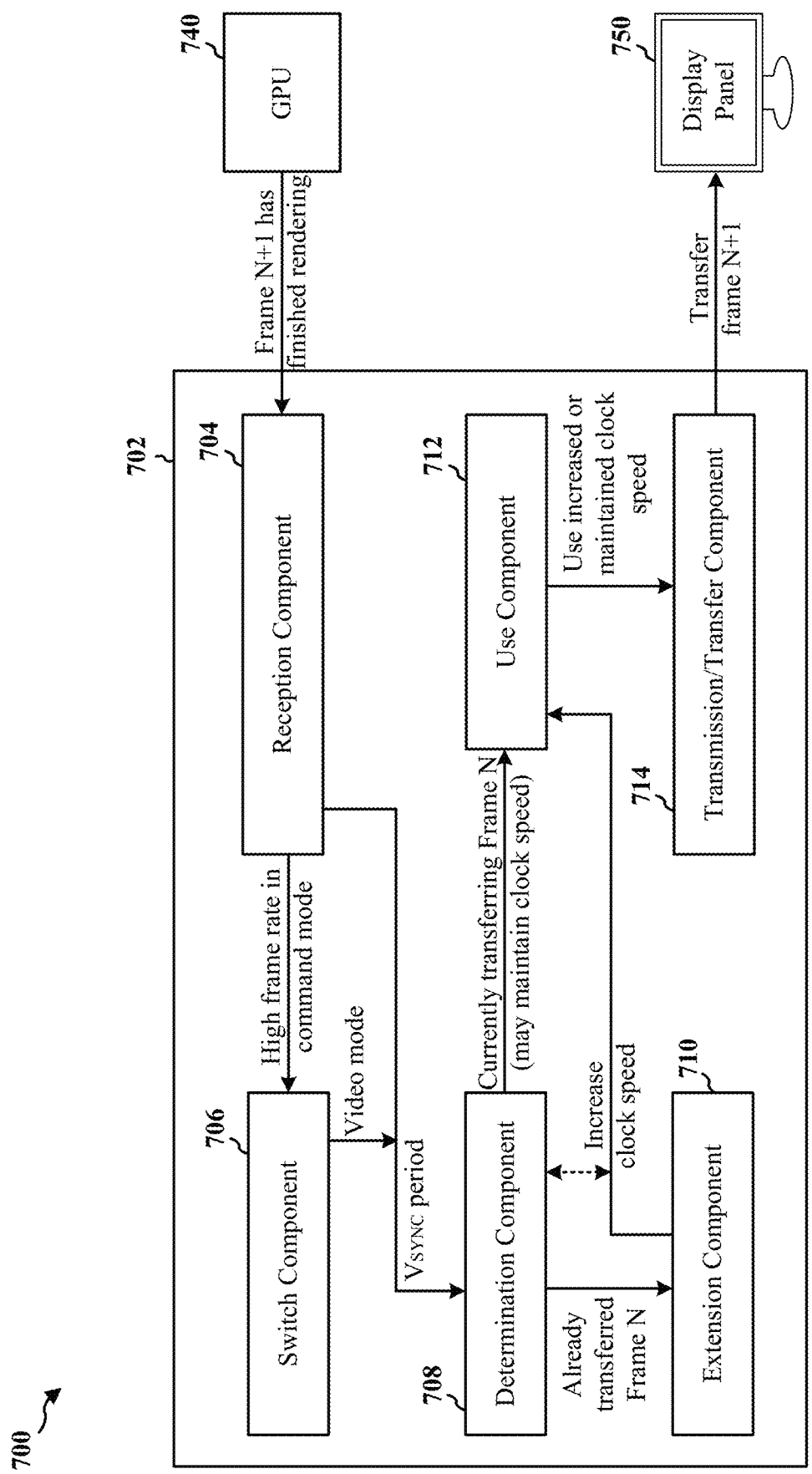
FIG. 7 is a conceptual data flow diagram illustrating the data flow between different means/components in an example apparatus.

FIG. 7 is a conceptual data flow diagram 700 illustrating the data flow between different means/components in an example apparatus 702. The apparatus 702 may be a frame composer, a frame processor, a display processor, a DPU, a wireless communication device, or other similar apparatus. The apparatus 702 includes a reception component 704 that receives an indication from a GPU 740 that a frame N+1 has finished rendering. For example, as described in connection with 506, the apparatus 702 may have to wait for GPU rendering to complete before the indication may be received by the reception component 702.

The apparatus 702 includes a switch component 706 that switches the apparatus 702 from a command mode to a video mode. For example, as described in connection with 602, the switch component 706 may switch from the command mode to the video mode when a constant display rate is requested, a high frame rate is detected, a high frame rate application is launched, etc. In configurations where the apparatus 702 is already in the video mode when the indication is received from the GPU 740, the reception component 704 may provide an indication of a $V_{SYNC}$ period directly to a determination component 708. Additionally or alternatively, the indication of the $V_{SYNC}$ period may be provided to the determination component 708 after the switch component 706 has switched from the command mode to the video mode.

The determination component 708 further included in the apparatus 702 is configured to determine a transfer status of a previous frame N. For example, as described in connection with 604, the determination component 708 may determine that the frame N is still currently transferring to a display panel (e.g., display panel 750). Thus, a clock speed may be maintained for transferring frame N+1. As described in connection with 606, the determination component 708 may determine that frame N is still currently transferring based on an indication from a DPU line counter that frame N is being transferred into a display buffer. As further described in connection with 604, the determination component 708 may determine that frame N has already been transferred to a display panel (e.g., the display panel 750). With more specificity, as described in connection with 606, the determination component 708 may determine that frame N has already been transferred based on an indication from the DPU line counter that frame N has been fully transferred into the display buffer.

The apparatus 702 includes an extension component 710 that extends the $V_{SYNC}$ period when frame N has already been transferred to the display panel 750. For example, as described in connection with 610, the extension component 710 may extend the $V_{SYNC}$ period from a first period T to a second period T+a when frame N has already been transferred. Extending the $V_{SYNC}$ period may require that a clock speed be increased for transferring frame N+1. As described in connection with 612, the determination component 708 may determine a second set of (increased) clock speeds for transferring frame N+1 based on reducing a transfer completion time of frame N+1 to a third period T−a.

The apparatus 702 includes a use component 712 that uses, with at least one clock, either the increased clock speeds or the maintained clock speeds depending on whether the determination component 708 determines that frame N is currently transferring or has already been transferred. For example, as described in connection with 608, the use component 712 uses a first set of clock speeds with the at least one clock when frame N is currently transferring and, as described in connection with 714, the use component 712 uses a second set of clock speeds with the at least one clock when frame N has already been transferred, the second set of clock speeds being faster than the first set of clock speeds. A transmission/transfer component 714 included in the apparatus 702 is configured to transmit/transfer frame N+1 to the display panel 750 based on the clock speeds used by the use component 712.

The apparatus 702 may include additional components that perform each of the blocks of the algorithm in the aforementioned flowchart of FIG. 6. As such, each block in the aforementioned flowchart of FIG. 6 may be performed by a component and the apparatus 702 may include one or more of those components. The components may be one or more hardware components specifically configured to carry out the stated processes/algorithm, implemented by a processor (e.g., logic and/or code executed by a processor) configured to perform the stated processes/algorithm, stored within a computer-readable medium for implementation by a processor, or some combination thereof.

Accordingly, when a length of a first frame is extended by the variable refresh rate feature, a second frame that follows the first frame may be shortened by a same length as that by which the first frame was extended in order to compensate for the extension of the first frame and maintain a stable FPS processing rate over a plurality of frames. More specifically, after completion of rendering of the second frame, the frame processor (e.g., a DPU) may determine whether the first frame is currently transferring to a display panel or has already been transferred to the display panel, where the first frame still currently transferring to the display panel indicates that the GPU rendering finished within an initial $V_{SYNC}$ time interval, and where the first frame having already been transferred to the display panel indicates that the GPU rendering was delayed beyond the initial $V_{SYNC}$ time interval. When the first frame is determined to be currently transferring, at least one clock may be maintained at a default set of clock speeds for transferring the second frame to display panel. Alternatively, when the first frame is determined to have already been transferred, the at least one clock may be accelerated/set to a second set of clocks speeds configured to complete the transfer of the second frame within the shortened time period and compensate for the extended time period/delay of the previous frame.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interrupted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

Computer-readable media may include computer data storage media or communication media including any medium that facilitates transfer of a computer program from one place to another. In this manner, computer-readable media generally may correspond to: (1) tangible computer-readable storage media, which is non-transitory; or (2) a communication medium such as a signal or carrier wave. Data storage media may be any available media that can be accessed by one or more computers or one or more processors to retrieve instructions, code, and/or data structures for implementation of the techniques described in this disclosure. By way of example, and not limitation, such computer-readable media can comprise RAM, ROM, EEPROM, compact disc-read only memory (CD-ROM), or other optical disk storage, magnetic disk storage, or other magnetic storage devices. Disk and disc, as used herein, includes compact disc (CD), laser disc, optical disc, digital versatile disc (DVD), floppy disk, and Blu-ray disc, where disks usually reproduce data magnetically, while discs usually reproduce data optically with lasers. Combinations of the above should also be included within the scope of computer-readable media. A computer program product may include a computer-readable medium.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques could be fully implemented in one or more circuits or logic elements.

Various examples have been described. These and other examples are within the scope of the following claims.

What is claimed is:

1. A method of frame processing, comprising:
   determining whether a first frame is currently transferring or has been transferred after completion of a rendering of a second frame, the second frame following the first frame;
   using, with at least one clock, a first set of clock speeds when the first frame is determined to be currently transferring and a second set of clock speeds when the first frame is determined to have been transferred, the second set of clock speeds being faster than the first set of clock speeds;
   transferring the second frame based on the used set of clock speeds after completion of the transfer of the first frame;
   extending a vertical synchronization ($V_{SYNC}$) period from a first period T to a second period T+a when the first frame has already been transferred, wherein the at least one clock is used with the second set of clock speeds; and
   determining the second set of clock speeds based on reducing a transfer completion time of the second frame in order to provide a transfer of the second frame within a third period T−a.

2. The method of claim 1, wherein the determining whether the first frame is currently transferring or has been transferred comprises determining whether a display processing unit (DPU) line counter indicates that the first frame is being transferred into a display buffer or has been fully transferred into the display buffer.

3. The method of claim 1, wherein the at least one clock comprises at least one of a display serial interface (DSI) clock or a mobile display processor (MDP) clock.

4. The method of claim 1, wherein the first set of clock speeds is a set of default clock speeds that provides for a transfer of a frame within a first period T.

5. The method of claim 1, wherein the second set of clock speeds is based on a variable refresh rate of the second frame.

6. The method of claim 1, further comprising switching from a command mode to a video mode when a constant display rate is requested.

7. An apparatus for frame processing, comprising:
   a memory; and
   at least one processor coupled to the memory and configured to:
   determine whether a first frame is currently transferring or has been transferred after completion of a rendering of a second frame, the second frame following the first frame;
   use, with at least one clock, a first set of clock speeds when the first frame is determined to be currently transferring and a second set of clock speeds when the first frame is determined to have been transferred, the second set of clock speeds being faster than the first set of clock speeds;
   transfer the second frame based on the used set of clock speeds after completion of the transfer of the first frame
   extend a vertical synchronization ($V_{SYNC}$) period from a first period T to a second period T+a when the first frame has already been transferred, wherein the at least one clock is used with the second set of clock speeds; and
   determine the second set of clock speeds based on reducing a transfer completion time of the second frame in order to provide a transfer of the second frame within a third period T−a.

8. The apparatus of claim 7, wherein for the determination of whether the first frame is currently transferring or has been transferred, the at least one processor is further configured to determine whether a display processing unit (DPU) line counter indicates that the first frame is being transferred into a display buffer or has been fully transferred into the display buffer.

9. The apparatus of claim 7, wherein the at least one clock comprises at least one of a display serial interface (DSI) clock or a mobile display processor (MDP) clock.

10. The apparatus of claim 7, wherein the first set of clock speeds is a set of default clock speeds that provides for a transfer of a frame within a first period T.

11. The apparatus of claim 7, wherein the second set of clock speeds is based on a variable refresh rate of the second frame.

12. The apparatus of claim 7, wherein the at least one processor is further configured to switch from a command mode to a video mode when a constant display rate is requested.

13. The apparatus of claim 7, wherein the apparatus is a wireless communication device.

14. A non-transitory computer-readable medium storing computer executable code, the code when executed by a processor, causes the processor to:
- determine whether a first frame is currently transferring or has been transferred after completion of a rendering of a second frame, the second frame following the first frame;
- use, with at least one clock, a first set of clock speeds when the first frame is determined to be currently transferring and a second set of clock speeds when the first frame is determined to have been transferred, the second set of clock speeds being faster than the first set of clock speeds;
- transfer the second frame based on the used set of clock speeds after completion of the transfer of the first frame
- extend a vertical synchronization ($V_{SYNC}$) period from a first period T to a second period T+a when the first frame has already been transferred, wherein the at least one clock is used with the second set of clock speeds; and
- determine the second set of clock speeds based on reducing a transfer completion time of the second frame in order to provide a transfer of the second frame within a third period T−a.

15. The non-transitory computer-readable medium of claim 14, wherein for the determination of whether the first frame is currently transferring or has been transferred, the processor is further configured to determine whether a display processing unit (DPU) line counter indicates that the first frame is being transferred into a display buffer or has been fully transferred into the display buffer.

16. The non-transitory computer-readable medium of claim 14, wherein the first set of clock speeds is a set of default clock speeds that provides for a transfer of a frame within a first period T.

* * * * *